United States Patent
Takeoka

(10) Patent No.: US 9,058,936 B2
(45) Date of Patent: *Jun. 16, 2015

(54) MULTILAYER CERAMIC CAPACITOR AND MANUFACTURING METHOD THEREOF

(71) Applicant: TAIYO YUDEN CO., LTD., Taito-ku, Tokyo (JP)

(72) Inventor: Shinsuke Takeoka, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 45 days.

This patent is subject to a terminal disclaimer.

(21) Appl. No.: 13/929,176

(22) Filed: Jun. 27, 2013

(65) Prior Publication Data

US 2014/0002951 A1    Jan. 2, 2014

(30) Foreign Application Priority Data

Jun. 27, 2012 (JP) .................. 2012-144236

(51) Int. Cl.
  *C04B 35/486* (2006.01)
  *H01G 4/10* (2006.01)
  *H01G 4/30* (2006.01)
  *H01G 4/12* (2006.01)
  *H01G 4/008* (2006.01)

(52) U.S. Cl.
  CPC .............. *H01G 4/30* (2013.01); *C04B 35/486* (2013.01); *H01G 4/0085* (2013.01); *H01G 4/1236* (2013.01)

(58) Field of Classification Search
  CPC ...................... C04B 35/486; H01G 4/1236
  USPC ........................... 501/135; 361/321.4
  See application file for complete search history.

(56) References Cited

U.S. PATENT DOCUMENTS

| 7,079,374 | B1 | 7/2006 | Kim et al. | |
| 7,830,645 | B2 * | 11/2010 | Takeoka | 361/321.4 |
| 2007/0009719 | A1 | 1/2007 | Naito et al. | |
| 2009/0046410 | A1 | 2/2009 | Takeoka | |
| 2013/0201602 | A1 * | 8/2013 | Takeoka | 361/301.4 |

FOREIGN PATENT DOCUMENTS

| JP | 2002-356371 A | 12/2002 |
| JP | 2006-290719 A | 10/2006 |
| JP | 2009-007209 A | 1/2009 |
| WO | 2006/082833 A1 | 8/2006 |
| WO | 2012/043427 A1 | 4/2012 |

* cited by examiner

*Primary Examiner* — Karl Group
(74) *Attorney, Agent, or Firm* — Law Office of Katsuhiro Arai

(57) ABSTRACT

A multilayer ceramic capacitor uses internal electrodes which are embedded between the dielectric layers and whose primary constituent is Cu, wherein when the composition of the dielectric layer is expressed by $100Ca_xZrO_3+aMnO_2+bLiO_{1/2}+cBO_{3/2}+dSiO_2+eAlO_{3/2}$, the contents of the respective constituents are $1.5 \le a \le 4.5$ mol, $0.8 \le b/(c+d) \le 2.0$, $0.9 \le d/c \le 1.5$, and $0 \le e \le 0.3$ mol relative to 100 mol of $Ca_xZrO_3$ (where $1.005 \le x \le 1.06$), and when $10 \le (b+c+d) \le 14.9$, an upper limit of x is defined by a line passing through (10, 1.03) and (14.9, 1.06), and a lower limit of x is defined by a line passing through (10, 1.005) and (14.9, 1.02), wherein the coordinates indicate ((b+c+d), x).

8 Claims, 1 Drawing Sheet

US 9,058,936 B2

MULTILAYER CERAMIC CAPACITOR AND MANUFACTURING METHOD THEREOF

BACKGROUND

1. Field of the Invention

The present invention relates to a multilayer ceramic capacitor that uses a dielectric porcelain composition whose primary constituent is $CaZrO_3$ and internal electrodes whose primary constituent is Cu, as well as a method of manufacturing such multilayer ceramic capacitor.

2. Description of the Related Art

Dielectric porcelains whose primary constituent is $CaZrO_3$ have traditionally been used for high-frequency dielectric resonators, filters, multilayer ceramic capacitors, etc. Ideally these multilayer ceramic capacitors, etc., have a smaller temperature coefficient of dielectric constant so that they can be used for modern devices of higher frequencies (approx. 100 MHz to 2 GHz). For the internal electrodes of multilayer ceramic capacitors, which require a low ESR (equivalent series resistance), small loss in the high-frequency range (high Q value), and lower cost, a base metal having a small specific resistance must be selected and accordingly Cu is used instead of Ni or Pd. On the other hand, the dielectric must be a non-reducing material that can be sintered at low temperatures of 1080° C. or below and prevents oxidation of Cu, partly because the dielectric must have a high Q value, small temperature coefficient of dielectric constant, and high reliability, and partly because Cu is used for the internal electrodes. In addition, ideally, use of a dielectric free from Pb and Bi is desired in order to reduce impact on the environment.

Dielectric porcelain compositions meeting the aforementioned requirements are already known, and use of such dielectric porcelain compositions for multilayer ceramic capacitors is described in multiple patent literatures.

For example, Patent Literature 1, which relates to a dielectric porcelain composition used for a multilayer ceramic capacitor using Cu as its electrode material, describes that, by using $(Ca_{1-x}Mg_x)(Zr_{1-y}Ti_y)O_3$ as a primary constituent and adding a glass composition of $aSiO_2$-$bLiO_{1/2}$-$cBO_{3/2}$-$dCaO$-$eBaO$ together with $MnO_2$ by specified quantities, a dielectric porcelain composition that can be sintered at low temperatures to provide a dielectric offering good characteristics including volume resistance can be produced. However, longevity traits of the multilayer ceramic capacitor are not fully examined.

Additionally, Patent Literature 2 describes a dielectric ceramic composition that uses Cu for its internal electrodes and can be sintered at 950° C., wherein such dielectric ceramic composition contains 100 parts by weight of a primary constituent of $(Ca_{1-x}Rx)(Zr_{1-y}Ti_y)O_3$, 0.5 to 2.5 parts by weight of a glass composition of $aSiO_2$-$bB_2O_3$-$cLi_2O$-$dK_2O$-$eCaO$-$fAl_2O_3$-$gTiO_2$-$hZrO_2$, and 1.0 to 5.0 parts by weight of a Mn compound, where R in the foregoing is either Mg or Sr as selected and $0 \leq x \leq 0.1$, $0 \leq y \leq 0.1$, $a+b+c+d+e+f+g+h=100$, $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$, and $1 \leq h \leq 7$ are satisfied. However, longevity traits of the resulting multilayer structure are not fully considered.

Furthermore, Patent Literature 3 describes a multilayer ceramic capacitor comprising: a ceramic material containing primary-phase particles whose primary constituent is a $CaZrO_3$ compound as well as secondary-phase particles containing at least Mn; internal electrodes which are embedded in the ceramic material and whose primary constituent is Cu; and external electrodes which are formed on both ends of the ceramic material and each connected electrically to one end of the internal electrodes; wherein Mn is contained by 2 mol or more and Si is contained by 0.69 mol or more in the ceramic material relative to 100 mol of the primary constituent; the area ratio occupied by the secondary-phase particles on a cross section of the ceramic material is 0.1% or more; and at least 67% of the secondary-phase particles whose particle size is 0.1 μm or more contain Cu and Si; and in such multilayer ceramic capacitor, both low-temperature sintering property and longevity traits are considered. However, achieving this requires a more complicated manufacturing process that includes: stacking multiple ceramic green sheets on which a conductive pattern has been formed, to form a ceramic laminate; sintering the ceramic laminate to form a ceramic material; applying a conductive paste for external electrodes on both ends of the ceramic material, followed by baking; and heat-treating the baked ceramic material in a reducing ambience at a temperature of 700° C. or above.

In light of the aforementioned circumstances, the inventors examined ways to improve the longevity traits of a multilayer ceramic capacitor using Cu for its internal electrodes.

For example, Patent Literature 4 proposes a dielectric porcelain composition expressed by $Ca_xZrO_3+aMn+bLi+cB+dSi$, wherein the contents of the respective constituents are $0.5 \leq a \leq 4.0$ mol and $6.0 \leq (b+c+d) \leq 15.0$ mol relative to 100 mol of $Ca_xZrO_3$ (where $1.00 \leq x \leq 1.10$) and wherein $0.15 \leq (b/(c+d)) \leq 0.55$ and $0.20 \leq (d/c) \leq 3.30$ are satisfied, based on the discovery that the Ca/Zr ratio and Mn, Li, B, and Si contents are factors determining the longevity of a $CaZrO_3$ dielectric porcelain and that, when the Ca/Zr ratio and Li—B—Si composition ratio meet certain conditions, the $CaZrO_3$ dielectric porcelain can be made denser at the melting point of Cu of 1080° C. or even below, even when the Li and B contents are reduced in order to keep the longevity from becoming shorter as a result of use of Cu internal electrodes.

In addition, the inventors examined ways to improve the longevity traits further and consequently discovered that, in the case of a system to which Si, B, Li, etc., have been added as secondary constituents of the aforementioned dielectric composition, Ca (alkali earth metal) elutes, in the sintering step, from the primary constituent of $CaZrO_3$ compound to the liquid phase which is considered to have been formed by Si, B, and Li that have been added as secondary constituents, and consequently a secondary phase in which excessive Zr is present is produced and this contributes to the deterioration of longevity traits. In particular, the inventors revealed that the presence of the secondary phase in which excessive Zr is present would have greater impact on the deterioration of longevity when a small amount of Mn, or 5.0 mol or less to be specific, has been added and therefore found that the longevity traits could be improved while keeping the specific dielectric constant and temperature coefficient of volume low by suppressing the abundance of the secondary phase (secondary phase containing more Zr than the primary constituent mentioned above) (Patent Literature 5).

PATENT LITERATURE

[Patent Literature 1] Japanese Patent Laid-open No. 2002-356371
[Patent Literature 2] Japanese Patent Laid-open No. 2006-290719
[Patent Literature 3] International Patent Laid-open No. 2006/082833
[Patent Literature 4] Japanese Patent Laid-open No. 2009-7209
[Patent Literature 3] International Patent Laid-open No. 2012/043427

SUMMARY

After continuous further studies in earnest, however, the inventors discovered that, with a multilayer ceramic capacitor that uses a dielectric porcelain composition whose primary constituent is $CaZrO_3$ and internal electrodes whose primary constituent is Cu, there is room for further improvement of sintering property.

In other words, while the inventions described in Patent Literatures 4 and 5 are such that a sintered compact is obtained by keeping the material in a reducing ambience for 2 hours at a temperature of 1080° C. or below, or preferably 1030° C. or below, an object of the present invention is to provide a multilayer ceramic capacitor that can be made denser within a shorter time than traditionally required, even when sintered at 1000° C. or below, by improving the sintering property of a dielectric porcelain composition whose primary constituent is $CaZrO_3$, as well as a method of manufacturing such multilayer ceramic capacitor.

After examining ways to further improve the sintering property of a multilayer ceramic capacitor whose primary constituent is $CaZrO_3$ and which uses Cu for its internal electrodes, when sintered at a low temperature of 1000° C. or below, or desirably 980° C. or below, the inventors discovered a more optimal composition ratio of additives.

Any discussion of problems and solutions involved in the related art has been included in this disclosure solely for the purposes of providing a context for the present invention, and should not be taken as an admission that any or all of the discussion were known at the time the invention was made.

The present invention, which was completed based on the foregoing knowledge, is described below:

[1] A multilayer ceramic capacitor comprising: multiple dielectric layers; internal electrodes which are embedded between the dielectric layers and whose primary constituent is Cu; and external electrodes each connected electrically to one end of the internal electrodes; wherein such multilayer ceramic capacitor is characterized in that the dielectric layer is primarily constituted by a $CaZrO_3$ compound and contains this primary constituent of $CaZrO_3$ compound as well as secondary constituents that include at least Mn, Li, B, and Si, and when its composition is expressed by $100Ca_xZrO_3 + aMnO_2 + bLiO_{1/2} + cBO_{3/2} + dSiO_2 + eAlO_{3/2}$, the contents of the respective constituents are as follows relative to 100 mol of $Ca_xZrO_3$ (where $1.005 \leq x \leq 1.06$):

$1.5 \leq a \leq 4.5$ mol $0.8 \leq b/(c+d) \leq 2.0$ $0.9 \leq d/c \leq 1.5$ $0 \leq e \leq 0.3$ mol;

and the relationship of (b+c+d) and x meets the ranges shown in Table 1 below (where if CaO is contained as a secondary constituent, then x represents the value of Ca/Zr based on the total sum of the primary constituent of $CaZrO_3$ and this CaO constituent).

TABLE 1

| b + c + d | Lower limit of x | Upper limit of x |
|---|---|---|
| 10 | 1.005 | 1.03 |
| 14.9 | 1.02 | 1.06 |

[2] A multilayer ceramic capacitor according to [1], characterized in that a to e are as follows:

$2.5 \leq a \leq 4.5$ mol $0.8 \leq b/(c+d) \leq 1.4$ $0.9 \leq d/c \leq 1.5$ $0.04 \leq e \leq 0.3$ mol

[3] A multilayer ceramic capacitor according to [1] or [2], characterized in that the relationship of (b+c+d) and x meets the ranges shown in Table 2 below.

TABLE 2

| b + c + d | Lower limit of x | Upper limit of x |
|---|---|---|
| 12 | 1.02 | 1.035 |
| 14.4 | 1.025 | 1.055 |

[4] A multilayer ceramic capacitor according to any one of [1] to [3], characterized in that the dielectric layer does not contain Ba.

[5] A method of manufacturing a multilayer ceramic capacitor according to any one of [1] to [4], characterized by comprising, in this order: a step to prepare a ceramic material which contains a primary constituent material of $CaZrO_3$ compound as well as secondary constituent materials of at least Mn, Li, B, and Si present in the form of oxide, glass, other compound, etc.; a sheet-forming step to form ceramic green sheets using the ceramic material; a printing step to print internal electrode patterns whose primary constituent is Cu on the ceramic green sheets; a lamination step to stack the ceramic green sheets obtained in the printing step to form a laminate; a cutting step to cut the laminate according to each internal electrode pattern to obtain a chip-shaped laminate; a sintering step to sinter the chip-shaped laminate obtained by the cutting step in a reducing ambience at a temperature of 1000° C. or below to obtain a sintered compact; and an external-electrode-forming step to apply a conductive paste for external electrodes on both ends of the sintered compact in a manner electrically connecting the internal electrodes, followed by baking.

[6] A method of manufacturing a multilayer ceramic capacitor according to any one of [1] to [4], characterized by comprising, in this order: a step to prepare a ceramic material which contains a primary constituent material of $CaZrO_3$ compound as well as secondary constituent materials of at least Mn, Li, B, and Si present in the form of oxide, glass, other compound, etc.; a sheet-forming step to form ceramic green sheets using the ceramic material; a printing step to print internal electrode patterns whose primary constituent is Cu on the ceramic green sheets; a lamination step to stack the ceramic green sheets obtained in the printing step to form a laminate; a cutting step to cut the laminate according to each internal electrode pattern to obtain a chip-shaped laminate; an external-electrode-forming step to apply a conductive paste for external electrodes on both ends of the chip-shaped laminate obtained by the cutting step, in a manner electrically connecting the internal electrodes; and a sintering step to sinter the chip-shaped laminate obtained by the external-electrode-forming step in a reducing ambience at a temperature of 1000° C. or below.

According to the present invention, a multilayer ceramic capacitor that uses Cu for its internal electrodes can be sintered within a shorter time than traditionally required while maintaining high longevity traits, even when sintered at 1000° C. or below, by using a specific dielectric porcelain composition whose primary constituent is $CaZrO_3$ for the dielectric layers.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

1: Multilayer ceramic capacitor
2: Dielectric layer
3: Internal electrode layer
4: External electrode

DETAILED DESCRIPTION OF EMBODIMENTS

Figure 1:
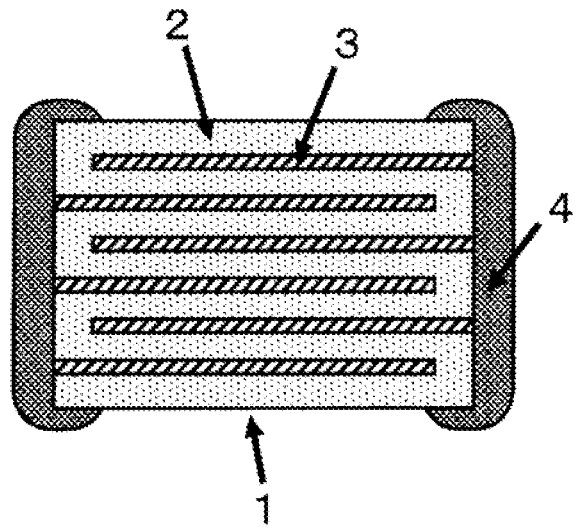
FIG. 1 is a drawing that illustrates an embodiment of the present invention schematically

FIG. 1 is a drawing that illustrates an embodiment of the present invention schematically.

As shown in FIG. 1, a multilayer ceramic capacitor 1 proposed by the present invention is structured in such a way that dielectric layers 2 constituted by a ceramic sintered compact are stacked alternately with internal electrode layers 3 whose primary constituent is Cu, with a pair of external electrodes 4, each electrically connected to the internal electrode layers 3 arranged alternately in the dielectric layers 2, formed on both ends of the multilayer ceramic capacitor 1.

The shape of the multilayer ceramic capacitor 1 is not specifically limited, but it is normally a rectangular solid. Its dimensions are not specifically limited, either, and any dimensions can be used as deemed appropriate for the application.

As illustrated under [Examples] later, the multilayer ceramic capacitor 1 proposed by the present invention is such that the dielectric layer 2 contains a primary constituent of $Ca_xZrO_3$ as well as secondary constituents that include at least Mn, Li, B, and Si, and when its composition is expressed by $100Ca_xZrO_3+aMnO_2+bLiO_{1/2}+cBO_{3/2}+dSiO_2+eAlO_{3/2}$, the contents of the respective constituents are as follows relative to 100 mol of $Ca_xZrO_3$ (where $1.005 \leq x \leq 1.06$):

$1.5 \leq a \leq 4.5$ mol or preferably $2.5 \leq a \leq 4.5$ mol, $0.8 \leq b/(c+d) \leq 2.0$ or preferably $0.8 \leq b/(c+d) \leq 1.4$, $0.9 \leq d/c \leq 1.5$, $0 \leq e \leq 0.3$ mol or preferably $0.04 \leq 2 \leq 0.3$ mol;

and the relationship of (b+c+d) and x meets the ranges shown in Table 1 below, or preferably the ranges shown in Table 2 below.

It should be noted that, under the present invention, a CaO constituent may be added to the dielectric layer in addition to the above, in which case the value of x represents the total sum of the primary constituent of $CaZrO_3$ and added CaO constituent and the range of x is defined by Ca/Zr of the total composition system.

TABLE 1

| b + c + d | Lower limit of x | Upper limit of x |
|---|---|---|
| 10 | 1.005 | 1.03 |
| 14.9 | 1.02 | 1.06 |

TABLE 2

| b + c + d | Lower limit of x | Upper limit of x |
|---|---|---|
| 12 | 1.02 | 1.035 |
| 14.4 | 1.025 | 1.055 |

Figure 2:
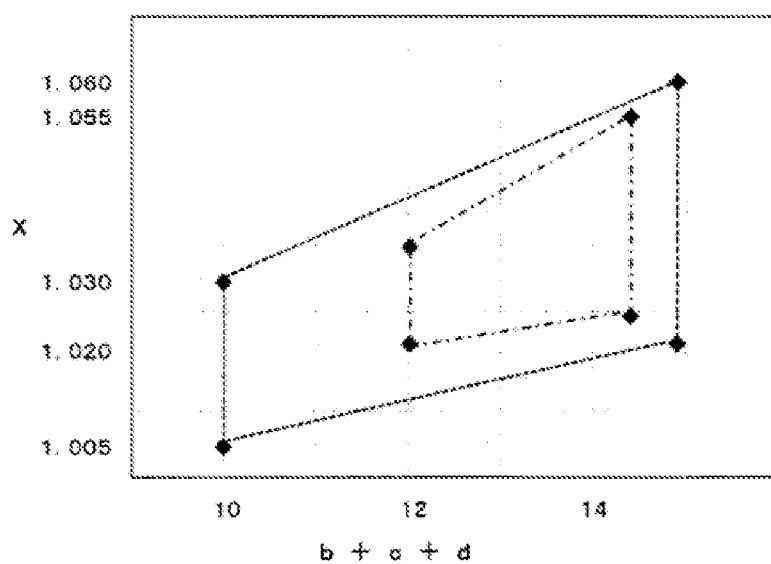
FIG. 2 is a drawing that illustrates the relationship of x and (b+c+d) in a composition expressed by $Ca_xZrO_3+aMnO_2+bLiO_{1/2}+cBO_{3/2}+dSiO_2+eAlO_{3/2}$

FIG. 2 is a graphic representation of the ranges shown in Tables 1 and 2 above; in other words, the operations and effects of the present invention can be achieved when the relationship of x and (b+c+d) is inside the range enclosed by the point where x=1.005 and b+c+d=10, the point where x=1.02 and b+c+d=14.9, the point where x=1.06 and b+c+d=14.9, and the point where x=1.03 and b+c+d=10 (range shown by the dotted line), or preferably inside the range enclosed by the point where x=1.02 and b+c+d=12, the point where x=1.025 and b+c+d=14.4, the point where x=1.055 and b+c+d=14.4, and the point where x=1.035 and b+c+d=12 (range shown by the broken line), as shown in FIG. 2.

The numerical ranges specified under the present invention are described in detail below.

Mn is added as a secondary constituent to add reduction resistance to the dielectric layer, where its content (a) is desirably $a \geq 1.5$ mol relative to 100 mol of $Ca_xZrO_3$ because achieving sufficient effects tends to become difficult when a<1.5 mol. Desirably, $a \leq 4.5$ mol is also satisfied because presence of excessive $MnO_2$ tends to be counterproductive by shortening the longevity if a>4.5 mol.

Li, B, and Si are added to sinter the $CaZrO_3$ compound at a low temperature of 1000° C. or below, where insufficient sintering results if the additive amount of b+c+d is less than 10 mol, while the longevity traits drop if it is greater than 15 mol, relative to 100 mol of $Ca_xZrO_3$.

In addition, insufficient sintering results if b/(c+d) is smaller than 0.8, while the longevity traits drop if it is greater than 2.0.

In addition, the longevity traits drop if d/c is smaller than 0.9, while insufficient sintering results if it is greater than 1.5.

Furthermore, the longevity traits drop if the lower limit of x representing the Ca/Zr ratio deviates from the ranges shown in Table 1 above, while insufficient sintering results if the upper limit of x deviates from the ranges shown in Table 1 above.

In addition, although it is better not to add Al in order to improve the longevity traits, not adding Al at all causes the sintering property to drop, so e 0.3 mol is preferred.

It should be noted that other elements may be contained as long as they do not counteract the object of the present invention.

However, Ba must not be contained in the dielectric layer because presence of Ba therein causes the sintering property to drop significantly.

Also, the $CaZrO_3$ compound constituting the primary constituent of the dielectric layer contains Hf as an impurity in an inevitable manner.

Next, the method of manufacturing a multilayer ceramic capacitor conforming to the present invention is described.

The method of manufacturing a multilayer ceramic capacitor conforming to the present invention is characterized by comprising: (1) a material step to prepare a ceramic material which contains a primary constituent material of $CaZrO_3$ compound as well as secondary constituent materials of at least Mn, Li, B, and Si present in the form of oxide, glass, other compound, etc.; (2) a sheet-forming step to form ceramic green sheets using the ceramic material; (3) a printing step to print internal electrode patterns whose primary constituent is Cu on the ceramic green sheets; (4) a lamination step to stack the ceramic green sheets completing the printing step to form a laminate; (5) a cutting step to cut the laminate according to each internal electrode pattern to obtain a chip-shaped laminate; (6) a sintering step to sinter the chip-shaped laminate obtained by the cutting step in a reducing ambience at a temperature of 1000° C. or below, or preferably 980° C. or below, to obtain a sintered compact; and (7) an external-electrode-forming step to apply a conductive paste for external electrodes on both ends of the sintered compact in a manner electrically connecting the internal electrodes, followed by baking.

In addition, the external-electrode-forming step in (7) may be carried out at the same time as the sintering step by applying a conductive paste for external electrodes on both ends of the chip-shaped laminate obtained by the cutting step, in a manner electrically connecting the internal electrodes, and then sintering the chip-shaped laminate in a reducing ambience at a temperature of 1000° C. or below, or preferably 980° C. or below.

EXAMPLES

The present invention is explained in greater detail below by using examples; however, it should be noted that the present invention is not limited by these examples in any way.

As secondary constituents, $CaCO_3$, $MnO_2$, $Li_2CO_3$, $B_2O_3$, $SiO_2$, and $Al_2O_3$ were weighed, relative to the primary constituent of $CaZrO_3$, so that the specified compositions in Table 3 could be achieved. Here, $CaZrO_3$ with a Ca/Zr ratio of 0.96 to 1.00 was used and x (total Ca/Zr ratio) was adjusted to the specified values in Table 3 by adding the secondary constituent of $CaCO_3$ accordingly. The weighed materials were wet-mixed with ethanol and then dried to obtain dielectric powder.

It should be noted that the ceramic material for providing these primary and secondary constituents need not be a carbonate or oxide, as long as it becomes an oxide when treated with heat. As comparative examples, variations to which $BaCO_3$ was further added as a secondary constituent were also prepared.

Next, PVB binder, plasticizer and organic solvent as medium were added as appropriate to the dielectric powder obtained as above to produce a ceramic slurry, after which the ceramic slurry was applied onto a polyester film using a reverse roll coater, etc., and processed into a green sheet of 7 μm in thickness. Thereafter, the green sheet was cut to the specified dimensions to obtain a rectangular ceramic green sheet.

An internal electrode paste whose primary constituent was Cu was printed onto the obtained rectangular ceramic green sheet using the screen printing method, etc., to form a conductive pattern.

For the internal electrode paste, a paste prepared by mixing and kneading together fine metal particles whose primary constituent was Cu, and an organic vehicle, etc., comprising organic binder dissolved in solvent, was used.

Next, multiple ceramic green sheets on which a conductive pattern had been formed were stacked in the specified direction. At this time, the ceramic green sheets were arranged in such a way that each pair of vertically adjacent ceramic green sheets would have their printed sides offset by around one half the sheet in the longitudinal direction of the internal electrode pattern. Furthermore, a protective ceramic green sheet on which no internal electrode pattern had been printed was stacked and pressure-bonded both on the top face and bottom face of the laminate. Thereafter, the laminate was cut to 1.0×0.5×0.5 mm in baked dimensions, to produce a ceramic laminate.

To remove the binder, the cut ceramic laminate was treated at 300 to 600° C. in an ambience inert enough not to oxidize Cu, after which it was heated at a rate of 500° C./hr in an ambience of $N_2$: 98%-$H_2$: 2% gas containing vapor, until the specified sintering temperature was reached. Once the sintering temperature was reached, the laminate was kept for 1 hour and then cooled at a rate of 600° C./hr to obtain a multilayer ceramic sintered compact in which internal electrodes were embedded.

Next, this multilayer ceramic sintered compact was barreled to expose the internal electrodes from the end faces of the sintered compact, after which an external electrode paste was applied on both ends and then dried, followed by baking at the specified temperature (700 to 900° C.) in an ambience of $N_2$ gas, to form external electrodes.

For the external electrode paste, a paste prepared by mixing and kneading together fine metal particles whose primary constituent was Cu, an organic vehicle, a small amount of frit, etc. was used; however, the external electrode paste is not limited to the foregoing and Ni, Ag, etc., can also be used for the external electrodes.

It is also possible to sinter the multilayer ceramic and form external electrodes at the same time by applying an external electrode paste beforehand on the end faces of the cut ceramic laminate from which the internal electrodes are exposed, drying the paste, and then treating the laminate at 300 to 600° C. in an inert ambience (inert enough not to oxidize Cu) to remove the binder, followed by heating at a rate of 500° C./hr in an ambience of $N_2$ gas containing vapor until the specified sintering temperature was reached, and by keeping the laminate for 1 hour once the sintering temperature is reached, and finally by cooling at a rate of 600° C./hr.

The sintering temperatures and longevity traits of the respective multilayer ceramic capacitors obtained as above are shown in Table 3. For these multilayer ceramic capacitors, the sintering temperature represents the temperature at which a Q value of 1000 or more can be ensured, because insufficient sintering property results in a significant drop in the Q value. As for the longevity traits, each sample was sintered for 1 hour at 980° C. and given a score of ○ if its average longevity was 50 hours or more, or ⊙ if the average longevity was 100 hours or more, when evaluated under the conditions of 150° C. and 25 V/μm.

As evident from Table 3, it is possible to complete the sintering within a shorter time than traditionally required while maintaining high longevity traits, by keeping the material composition of the dielectric layer within the specified range. (In the table, comparative examples are indicated by *.)

any defined meanings do not necessarily exclude ordinary and customary meanings in some embodiments.

The present application claims priority to Japanese Patent Application No. 2012-144236, filed Jun. 27, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

TABLE 3 (1)

| Con-dition | Compounding composition |  |  |  |  |  |  | Equivalent ratios of constituents |  |  |  |  |  | Evaluation result |  |
|---|---|---|---|---|---|---|---|---|---|---|---|---|---|---|---|
| | Ca/Zr | $Li_2CO_3$ | $SiO_2$ | $B_2O_3$ | $MnO_2$ | $Al_2O_3$ | $BaCO_3$ | B + Si + Li | Li/(B + Si) | Si/B | Mn | Al | Ba | Sintering temperature | Longevity at 980° C. |
| No1 | 1.005 | 3.2 | 1.8 | 0.9 | 1.5 | 0.13 | | 10.0 | 1.75 | 1.00 | 1.50 | 0.26 | | 980 | ○ |
| No2 | 1.030 | 3.2 | 1.8 | 0.9 | 2.5 | 0.13 | | 10.0 | 1.75 | 1.00 | 2.50 | 0.26 | | 980 | ⊙ |
| No3 | 1.020 | 3.6 | 3.7 | 2.0 | 3.5 | 0.13 | | 15.0 | 0.93 | 0.90 | 3.50 | 0.26 | | 960 | ○ |
| No4 | 1.060 | 3.6 | 3.7 | 2.0 | 2.5 | 0.13 | | 15.0 | 0.93 | 0.90 | 2.50 | 0.26 | | 960 | ○ |
| No5 | 1.020 | 3.5 | 3.0 | 1.0 | 3.5 | 0.15 | | 12.0 | 1.40 | 1.50 | 3.50 | 0.30 | | 960 | ⊙ |
| No6 | 1.035 | 3.5 | 3.0 | 1.0 | 2.5 | 0.15 | | 12.0 | 1.40 | 1.50 | 2.50 | 0.30 | | 960 | ⊙ |
| No7 | 1.025 | 3.6 | 3.6 | 1.8 | 4.5 | 0.02 | | 12.0 | 1.00 | 1.00 | 4.50 | 0.04 | | 940 | ⊙ |
| No8 | 1.055 | 3.6 | 3.6 | 1.8 | 4.5 | 0.03 | | 14.5 | 1.00 | 1.00 | 4.50 | 0.06 | | 960 | ⊙ |
| No9 | 1.020 | 3.8 | 2.2 | 1.1 | 1.5 | 0.13 | | 14.5 | 1.75 | 1.00 | 1.50 | 0.26 | | 960 | ○ |
| No10 | 1.040 | 2.9 | 3.6 | 1.8 | 2.5 | 0.13 | | 12.0 | 0.80 | 1.00 | 2.50 | 0.26 | | 960 | ⊙ |
| No11 | 1.020 | 3.5 | 3.0 | 1.0 | 2.5 | 0.13 | | 13.0 | 1.40 | 1.50 | 2.50 | 0.26 | | 960 | ⊙ |
| No12 | 1.030 | 4.0 | 2.0 | 1.0 | 2.5 | 0.15 | | 12.0 | 2.00 | 1.00 | 2.50 | 0.30 | | 960 | ○ |
| No13 | 1.040 | 3.0 | 3.3 | 1.8 | 2.5 | 0.13 | | 12.0 | 0.86 | 0.90 | 2.50 | 0.26 | | 960 | ⊙ |
| No14 | 1.030 | 3.5 | 3.5 | 1.8 | 3.5 | | | 13.0 | 1.00 | 1.00 | 3.50 | | | 940 | ○ |
| No15 | 1.010 | 3.5 | 2.0 | 1.0 | 1.5 | 0.05 | | 14.0 | 1.75 | 1.00 | 1.50 | 0.10 | | 960 | ○ |
| No16 | 1.040 | 3.0 | 3.5 | 1.8 | 2.5 | 0.13 | | 11.0 | 0.86 | 1.00 | 2.50 | 0.26 | | 960 | ⊙ |
| No17 | 1.020 | 3.5 | 3.5 | 1.8 | 2.5 | 0.13 | | 13.0 | 1.00 | 1.00 | 2.50 | 0.26 | | 960 | ○ |
| No18 | 1.040 | 3.5 | 3.5 | 1.8 | 2.5 | 0.13 | | 14.0 | 1.00 | 1.00 | 2.50 | 0.26 | | 960 | ⊙ |
| No19 | 1.030 | 3.5 | 3.5 | 1.8 | 3.5 | 0.03 | | 14.0 | 1.00 | 1.00 | 3.50 | 0.06 | | 940 | ⊙ |
| No20 | 1.050 | 3.5 | 3.5 | 1.8 | 3.5 | 0.03 | | 14.0 | 1.00 | 1.00 | 3.50 | 0.06 | | 960 | ⊙ |
| *No21 | 1.020 | 3.8 | 2.2 | 1.1 | 1.5 | 0.03 | 1.0 | 12.0 | 1.75 | 1.00 | 1.50 | 0.06 | 1.0 | X | |
| *No22 | 1.030 | 3.5 | 3.5 | 1.8 | 2.5 | 0.13 | 1.5 | 14.0 | 1.00 | 1.00 | 2.50 | 0.26 | 1.5 | X | |
| *No23 | 1.000 | 2.5 | 0.0 | 2.0 | 2.5 | 0.03 | | 9.0 | 1.25 | 0.00 | 2.50 | 0.06 | | X | |
| *No24 | 1.000 | 3.5 | 0.0 | 2.0 | 2.5 | 0.03 | | 11.0 | 1.75 | 0.00 | 2.50 | 0.06 | | 960 | X |
| *No25 | 1.060 | 3.5 | 3.5 | 1.8 | 3.5 | 0.03 | | 14.0 | 1.00 | 1.00 | 3.50 | 0.06 | | X | |
| *No26 | 1.030 | 3.9 | 3.9 | 2.2 | 2.5 | 0.13 | | 16.0 | 0.93 | 0.87 | 2.50 | 0.26 | | 940 | X |
| *No27 | 1.030 | 3.0 | 3.5 | 1.8 | 0.1 | 0.13 | | 13.0 | 0.86 | 1.00 | 0.05 | 0.26 | | 960 | X |
| *No28 | 1.030 | 3.0 | 3.5 | 1.8 | 5.5 | 0.13 | | 13.0 | 0.86 | 1.00 | 5.50 | 0.26 | | 980 | X |
| *No29 | 1.035 | 1.6 | 4.2 | 2.3 | 2.0 | | | 12.0 | 0.37 | 0.90 | 2.00 | | | X | |
| *No30 | 1.020 | 4.5 | 1.5 | 0.8 | 2.5 | 0.13 | | 12.0 | 3.00 | 1.00 | 2.50 | 0.26 | | 960 | X |
| *No31 | 1.020 | 3.5 | 0.0 | 3.0 | 2.5 | 0.03 | | 13.0 | 1.17 | 0.00 | 2.50 | 0.06 | | 960 | X |
| *No32 | 1.020 | 3.5 | 3.0 | 0.5 | 2.5 | 0.13 | | 11.0 | 1.75 | 3.00 | 2.50 | 0.26 | | X | |
| *No33 | 1.020 | 3.5 | 1.9 | 1.1 | 2.5 | 0.25 | | 11.0 | 1.75 | 0.90 | 2.50 | 0.50 | | X | |
| *No34 | 1.040 | 2.5 | 2.0 | 1.0 | 2.5 | 0.03 | | 9.0 | 1.25 | 1.00 | 2.50 | 0.06 | | X | |
| *No35 | 1.010 | 3.6 | 3.6 | 2.1 | 2.5 | 0.13 | | 15.0 | 0.93 | 0.87 | 2.50 | 0.26 | | 940 | X |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure,

I claim:

1. A multilayer ceramic capacitor, comprising:
   multiple dielectric layers;
   internal electrodes which are embedded between the dielectric layers and whose primary constituent is Cu; and
   external electrodes each connected electrically to one end of the internal electrodes;
   wherein the dielectric layer contains a primary constituent of $CaZrO_3$ compound as well as secondary constituents that include at least Mn, Li, B, and Si, and when its composition is expressed by $100Ca_xZrO_3 + aMnO_2 + bLiO_{1/2} + cBO_{3/2} + dSiO_2 + eAlO_{3/2}$, contents of the respective constituents are as follows relative to 100 mol of $Ca_xZrO_3$ (where $1.005 \leq x \leq 1.06$):

$1.5 \leq a \leq 4.5$ mol $0.8 \leq b/(c+d) \leq 2.0$ $0.9 \leq d/c \leq 1.5$ $0 \leq e \leq 0.3$ mol;

and when $10 \leq (b+c+d) \leq 14.9$, an upper limit of x is defined by a line passing through (10, 1.03) and (14.9, 1.06), and a lower limit of x is defined by a line passing through (10, 1.005) and (14.9, 1.02), wherein the coordinates indicate ((b+c+d), x) (where if CaO is contained as a secondary constituent, then x represents a value of Ca/Zr based on a total sum of the primary constituent of $CaZrO_3$ and this CaO constituent).

2. A multilayer ceramic capacitor according to claim 1, wherein a to e are as follows:

$2.5 \leq a \leq 4.5$ mol $0.8 \leq b/(c+d) \leq 1.4$ $0.9 \leq d/c \leq 1.5$ $0.04 \leq e \leq 0.3$ mol.

3. A multilayer ceramic capacitor according to claim 1, wherein when $12 \leq (b+c+d) \leq 14.4$, an upper limit of x is defined by a line passing through (12, 1.035) and (14.4, 1.055), and a lower limit of x is defined by a line passing through (12, 1.02) and (14.4, 1.025), wherein the coordinates indicate ((b+c+d), x).

4. A multilayer ceramic capacitor according to claim 2, wherein when $12 \leq (b+c+d) \leq 14.4$, an upper limit of x is defined by a line passing through (12, 1.035) and (14.4, 1.055), and a lower limit of x is defined by a line passing through (12, 1.02) and (14.4, 1.025), wherein the coordinates indicate ((b+c+d), x).

5. A multilayer ceramic capacitor according to claim 1, wherein the dielectric layer does not contain Ba.

6. A multilayer ceramic capacitor according to claim 2, wherein the dielectric layer does not contain Ba.

7. A multilayer ceramic capacitor according to claim 3, wherein the dielectric layer does not contain Ba.

8. A multilayer ceramic capacitor according to claim 4, wherein the dielectric layer does not contain Ba.

\* \* \* \* \*